United States Patent Office 3,388,116
Patented June 11, 1968

3,388,116
PROCESS FOR THE PREPARATION OF
RIBOFLAVIN PHOSPHORIC ACID
Ctirad Podesva, Montreal, Quebec, Canada, assignor to
Delmar Chemicals Limited, Montreal, Quebec, Canada
No Drawing. Filed Sept. 16, 1966, Ser. No. 579,848
12 Claims. (Cl. 260—211.3)

ABSTRACT OF THE DISCLOSURE

A process is provided for the phosphorylation of riboflavin in a reaction medium comprising tetramethylene sulfone. Any of the known phosphorylating agents can be used. Preferred are phosphorus oxychloride, chlorophosphoric acid and a mixture of phosphorus oxychloride and ortho-phosphoric acid. The phosphorylated riboflavin is recovered by any convenient method, and can be transformed into a pharmaceutically acceptable salt, e.g., Na.

---

The present invention relates to the preparation of riboflavin phosphoric acid. More particularly it refers to the production of riboflavin monophosphoric acid.

Riboflavin, otherwise known as vitamin $B_2$, is only slightly soluble in water, and for this reason its use in formulations of liquid vitamin preparations is not practical. Alkali metal or organic amine salts of riboflavin phosphoric acid, on the other hand, are markedly soluble in water and therefore suitable for the above-mentioned use.

The preparation of riboflavin phosphoric acid was first disclosed in British Patent No. 451,938, accepted Aug. 10, 1936. The method consists of phosphorylating vitamin $B_2$ with phosphorus oxychloride in pyridine. Due to the fact that riboflavin is only slightly soluble in pyridine, excessive amounts of this solvents have to be used, which is an obvious disadvantage for large scale production as only relatively small amounts of product can be obtained even when using large volume reactors. Another difficulty inherent in this process is the removal of large amounts of pyridine from the reaction mixture before the product can be isolated.

Canadian Patent No. 520,586, issued Jan. 10, 1956 in the name of A. L. Morrison et al., on the other hand, recommends using a phenol solution, e.g., a phenol-chloroform mixture as reaction medium. Phosphorus pentoxide is used as phosphorylating agent. Here again, however, an excessive amount of the solvent medium has to be used (3.76 g. of riboflavin is phosphorylated in a mixture of 120 g. of phenol and 40 ml. of chloroform), and the disadvantages are obvious: high volume reactors are needed to produce relatively small quantities of riboflavin phosphate, and considerable quantities of solvents have to be removed before the product can be isolated. The same difficulties are encountered when following procedures which use excess of the phosphorylating agent as a solvent medium. So, e.g., Canadian Patent No. 523,997 issued Apr. 17, 1956, in the name of L. A. Flaxser et al. discloses phosphorylation of 3.76 g. of riboflavin in dichlorophosphoric acid prepared from 61.3 g. of phosphorus oxychloride and 7.2 g. of water. The removal of great amounts of highly corrosive acids is then tedious and uneconomical. Difficulties of a different nature arise when a method described in U.S. Patent No. 2,603,632 issued July 15, 1952 in the name of J. F. Weidenheimer et al. is applied. Here 100% ortho-phosphoric acid is used in an amount equal to the weight of the starting riboflavin. It is extremely difficult to produce an intimate mixture even of the most finely powdered riboflavin with the syrupy 100% ortho-phosphoric acid. If the amount of the acid is increased, formation of polyesters results, as disclosed in the same patent, with a corresponding decrease of the riboflavin content in the finished product.

It can be readily seen from the cited examples that whereas a number of compounds containing pentavalent phosphorus, such as ortho-phosphoric acid, chlorophosphoric acids, phosphorus pentoxide or phosphorus oxychloride can be used with more or less equal success for the preparation of riboflavin phosphates, there has not yet been disclosed a diluent or solvent which would permit the esterification to proceed in a reasonable volume and which could be easily removed after the completion of the reaction without contamination of the finished product.

The object of the present invention is to provide such a solvent. It is another object to provide an economical method for preparation of riboflavin phosphoric acid without the necessity of preparing special phosphorylating agents, such as 100% ortho-phosphoric acid or chloro-(mono or di-) phosphoric acid. Other objects will be obvious from the following description.

It has now been found that tetramethylene sulfone, a product which is commercially readily available under the name Sulfolane, provides an ideal medium for the phosphorylation of riboflavin. Tetramethylene sulfone is miscible in all proportions with phosphoric acid, chlorophosphoric acids, phosphorus oxychloride, and other phosphorylating agents. At the same time, it dissolves at room temperature an amount of riboflavin sufficient to allow a fast esterification of the latter. As the resulting ester is completely soluble in the reaction medium, a further amount of riboflavin is dissolved and esterified by means of the phosphorylating agent present with the result that after some time a homogeneous solution results. The reaction is preferably carried out at room temperature, whereby any decomposition of riboflavin by heat is minimized, and is completed in a few hours. Lower temperatures, as expected, reduce the rate of phosphorylation. Polyesters, if formed, are ultimately transformed into monoester by treatment with water. The product can then be isolated by methods known in the art. Tetramethylene sulfones can conveniently be removed from the reaction mixture by washing with a selective solvent such as, e.g., ethanol (or other lower aliphatic alcohols), in which it is infinitely soluble, whereas the riboflavin phosphoric acid is poorly soluble in the same.

The actual phosphorylation can be performed by phosphorus oxychloride, chlorophosphoric acids, a mixture of phosphorus oxychloride and ortho-phosphoric acid, and other known phosphorylating agents. The preferred phosphorylating agent, however, according to the present invention, is phosphorus oxychloride, which is both economical and readily available. As little as one part or as much as four parts by weight of phosphorus oxychloride can be used per one part by weight or riboflavin. The preferred amount is about 2–3 parts by weight of phosphorus oxychloride per one part by weight of riboflavin. Amounts of phosphorus oxychloride higher than 4 parts while not harmful, are nevertheless not necessary. The amount of tetramethylene sulfone may be widely varied. It has, however, been found practical to adjust it in such a way as to have a total of about six parts by weight of the combined phosphorus oxychloride and tetramethylene sulfone per one part by weight of riboflavin. Higher amounts of tetramethylene sulfone while permissible do not serve any useful purpose. When a mixture of phosphorus oxychloride and orthophosphoric acid is used as phosphorylating agent, it is preferred to use about 70–140 parts by weight of phosphorus oxychloride to about 100 parts by weight of ortho-phosphoric acid. With a mixture of phosphorus oxychloride and ortho-phosphoric acid as phosphorylating agent, slightly larger amounts of tetramethylene sulfone are advisable. Operable ranges include at least two parts by weight of the aforesaid mixture and at least three parts of tetramethylene sulfone for one part of riboflavin, all parts being by weight.

The following table shows relative amounts of riboflavin which can be phosphorylated in a reactor of 1000 liters capacity as compared with the amounts of riboflavin which could be phosphorylated in the same reactor according to prior art:

| | kgs. |
|---|---|
| Riboflavin, British Patent No. 451,938 | 5 |
| Riboflavin, Canadian Patent No. 520,586 | 23.5 |
| Riboflavin, Canadian Patent No. 523,997 | 55 |
| Riboflavin, Present invention | 143 |

The following examples are illustrative of the present invention, but should not be considered as limitative of its scope.

EXAMPLE 1

To a stirred suspension of 10 g. of riboflavin in 40 g. of tetramethylene sulfone were added with cooling, 20 g. of phosphorus oxychloride. After about 30 minutes stirring at room temperature, a dark homogeneous solution resulted. The agitation was continued overnight. The next day, 10.5 g. of water were slowly added while maintaining the temperature between 40–60° C. by external cooling. 500 ml. of ethanol were then added and the reaction mixture refluxed for 10 minutes. After cooling and standing overnight, the yellow crystals of the monoester which had deposited were collected by filtration, washed with ethanol and ether and dried. There was obtained 9.2 g. of product, melting at about 195° C.

A water soluble sodium salt was prepared from the ester by suspending the latter in water, adjusting the pH to 5.5–6.5 by means of dilute sodium hydroxide, whereby a clear orange solution resulted, and isolating the salt by precipitation with alcohol. The riboflavin phosphate sodium salt was obtained as a dihydrate of orange yellow colour. It gave clear aqueous solutions at 4–5% concentrations. The phosphorus content of the product was found to agree with the theoretical amount calculated for the monoester.

EXAMPLE 2

To a stirred suspension of 10 g. of riboflavin in 20 g. of tetramethylene sulfone were added with cooling, 40 g. of phosphorus oxychloride. After overnight stirring at room temperature 21 g. of water were carefully added while maintaining the temperature between 40–60° C. The reaction mixture was then diluted with ethanol, refluxed for 10 minutes and after cooling the crystalline riboflavin ortho-phosphoric acid ester collected by filtration. The yield and quality of the product were identical with those from Example 1.

EXAMPLE 3

The same amount of riboflavin was phosphorylated under the same conditions as in Example 2, except that 10 g. of phosphorus oxychloride and 50 g. of tetramethylene sulfone were used. The reaction mixture was worked up as in previous examples, and the sodium salt was prepared in aqueous solution. A small quantity of unesterified riboflavin was removed by filtration from the hazy solution before the salt was precipitated with ethanol.

EXAMPLE 4

To 100 g. of 85% ortho-phosphoric acid were added with cooling, 128 g. of phosphorus oxychloride. After 48 hours stirring at room temperature, 80 g. of the mixture were cooled in an ice bath, and a suspension of 20 g. of riboflavin in 60 ml. of tetramethylene sulfone was added with stirring. The stirring was then continued at room temperature for 24 hours. The homogeneous solution was diluted with cooling with 1000 ml. of ethanol, the solution heated under reflux for 10 minutes, then cooled to 5–15° C. After standing for 48 hours the crystalline riboflavin phosphoric acid was collected by filtration and washed with ethanol. The yield was 17 g., M.P. about 195° C.

I claim:

1. In a process for the phosphorylation of riboflavin wherein riboflavin is reacted with a phosphorylating agent and riboflavin phosphoric acid thus formed is recovered, the improvement which comprises carrying out said reaction in the presence of tetramethylene sulfone.

2. A process as defined in claim 1, wherein the phosphorylating agent is selected from the group consisting of phosphorus oxychloride, chlorophosphoric acid and a mixture of phosphorus oxychloride and ortho-phosphoric acid.

3. A process as defined in claim 1, wherein the phosphorylating agent is phosphorus oxychloride.

4. A process as defined in claim 1, wherein the phosphorylating agent is a mixture of phosphorus oxychloride and ortho-phosphoric acid.

5. A process as defined in claim 3, wherein phosphorus oxychloride is used in an amount of at least one part, and tetramethylene sulfone is used in an amount of at least two parts for 1 part of riboflavin, all parts being by weight.

6. A process as defined in claim 3, wherein phosphorus oxychloride is used in an amount of about 1–4 parts, and tetramethylene sulfone is used in an amount of about 2–5 parts, the total amounts of phosphorus oxychloride and tetramethylene sulfone being about 6 parts for 1 part of riboflavin, all parts being by weight.

7. A process as defined in claim 4, wherein said phosphorylating mixture is used in an amount of at least two parts, and tetramethylene sulfone is used in an amount of at least three parts per part of riboflavin, all parts being by weight.

8. A process as defined in claim 7, wherein said ortho-phosphoric acid is approximately 85% ortho-phosphoric acid.

9. The process of claim 7 wherein there is used 1 part of weight of riboflavin with at least 2 parts by weight of a phosphorylating mixture obtained by mixing about 70–140 parts by weight of phosphorus oxychloride with about 100 parts by weight of orthophosphoric acid and at least 3 parts by weight of tetramethylene sulfone and recovering the phosphoric acid ester of riboflavin thus formed.

10. A process as defined in claim 1, which further comprises removing tetramethylene sulfone after completion of the reaction by washing with a selective solvent for the said tetramethylene sulfone.

11. A process as defined in claim 10, wherein said selective solvent is a lower aliphatic alcohol.

12. A process as defined in claim 9, wherein said ortho-phosphoric acid is approximately 85% ortho-phosphoric acid.

References Cited

UNITED STATES PATENTS

| 2,111,491 | 3/1938 | Kuhn et al. | 260—211.3 |
| 2,535,385 | 12/1950 | Breivogel | 260—211.3 |
| 2,603,632 | 7/1952 | Weidenheimer et al. | 260—211.3 |
| 2,610,179 | 9/1952 | Flexser et al. | 260—211.3 |

LEWIS GOTTS, *Primary Examiner.*

JOHNNIE R. BROWN, *Examiner.*